(12) United States Patent
Zelina et al.

(10) Patent No.: US 11,578,869 B2
(45) Date of Patent: Feb. 14, 2023

(54) ACTIVE BOUNDARY LAYER CONTROL IN DIFFUSER

(71) Applicant: General Electric Company, Schenectady, NY (US)

(72) Inventors: Joseph Zelina, Waynesville, OH (US); Clayton S. Cooper, Loveland, OH (US); Michael T. Bucaro, Arvada, CO (US); Steven C. Vise, Loveland, OH (US); John Thomas Herbon, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/325,938

(22) Filed: May 20, 2021

(65) Prior Publication Data

US 2022/0373181 A1 Nov. 24, 2022

(51) Int. Cl.
*F23R 3/10* (2006.01)
*F02C 3/14* (2006.01)

(52) U.S. Cl.
CPC .............. *F23R 3/10* (2013.01); *F02C 3/14* (2013.01); *F05D 2220/32* (2013.01); *F05D 2240/35* (2013.01)

(58) Field of Classification Search
CPC ...... F23R 3/04; F23R 3/10; F23R 3/26; F02C 3/14; F05D 2220/32; F05D 2240/35
See application file for complete search history.

(56) References Cited

U.S. PATENT DOCUMENTS

| 1,472,641 | A | * | 10/1923 | Etrich | E21C 25/10 175/379 |
| 3,589,127 | A | * | 6/1971 | Kenworthy | F23R 3/14 431/352 |
| 3,877,221 | A | * | 4/1975 | Lefebvre | F23R 3/04 60/751 |
| 3,879,939 | A | | 4/1975 | Markowski | |
| 3,910,035 | A | * | 10/1975 | Juhasz | F23R 3/26 60/39.23 |
| 3,998,393 | A | * | 12/1976 | Petty | H01S 3/0953 372/98 |

(Continued)

FOREIGN PATENT DOCUMENTS

| CN | 111594872 A | 8/2020 |
| KR | 102059187 B1 | 12/2019 |
| WO | 2018190926 A1 | 10/2018 |

*Primary Examiner* — Craig Kim
(74) *Attorney, Agent, or Firm* — Venable LLP; Michele V. Frank (57) ABSTRACT

A combustor for a turbine engine is provided, the combustor includes an outer liner, an inner liner and a dome that together define a combustion chamber; a diffuser positioned upstream of the combustion chamber, the diffuser being configured to receive air flow from a compressor section and to provide a flow of compressed air to the combustion chamber; and an outer cowl and an inner cowl located upstream of the combustion chamber, the outer cowl and the inner cowl being configured to direct a portion of air flow from the diffuser to the combustion chamber. The diffuser is configured to output air flow having an amount of air pressure maximized at a center of the air flow so as to optimize total air pressure fed to the combustion chamber through the dome.

18 Claims, 8 Drawing Sheets

(56) References Cited

U.S. PATENT DOCUMENTS

| | | | | |
|---|---|---|---|---|
| 4,380,895 A * | 4/1983 | Adkins | ............... | F23R 3/04 60/39.23 |
| 4,446,692 A * | 5/1984 | Adkins | ............... | F23R 3/26 60/39.23 |
| 5,335,501 A * | 8/1994 | Taylor | ............... | F04D 29/544 60/751 |
| 5,339,622 A * | 8/1994 | Bardey | ............... | F01D 25/32 55/306 |
| 5,619,855 A * | 4/1997 | Burrus | ............... | F23R 3/20 60/737 |
| 5,737,915 A * | 4/1998 | Lin | ............... | F04D 29/54 415/207 |
| 5,845,482 A * | 12/1998 | Carscallen | ............... | F04D 27/023 60/226.3 |
| 5,918,459 A * | 7/1999 | Nakae | ............... | F23R 3/26 60/39.23 |
| 6,564,555 B2 * | 5/2003 | Rice | ............... | F23R 3/12 60/746 |
| 6,651,439 B2 * | 11/2003 | Al-Roub | ............... | F23R 3/04 60/751 |
| 6,843,059 B2 | 1/2005 | Burrus et al. | | |
| 7,181,914 B2 | 2/2007 | Pidcock et al. | | |
| 7,185,495 B2 * | 3/2007 | Leachman | ............... | F02C 6/08 60/785 |
| 8,438,855 B2 | 5/2013 | Schott | | |
| 8,484,980 B1 * | 7/2013 | Trefny | ............... | F23R 3/42 60/767 |
| 8,833,087 B2 * | 9/2014 | Rice | ............... | F01D 9/065 60/797 |
| 9,046,272 B2 * | 6/2015 | Rice | ............... | F23R 3/60 |
| 9,574,575 B2 * | 2/2017 | Graves | ............... | F04D 29/44 |
| 10,337,406 B2 * | 7/2019 | Suciu | ............... | F01D 25/24 |
| 10,669,938 B2 * | 6/2020 | Suciu | ............... | F02C 7/18 |
| 10,907,834 B2 * | 2/2021 | Park | ............... | F02C 7/262 |
| 11,286,884 B2 * | 3/2022 | Boardman | ............... | F02C 3/04 |
| 2010/0005804 A1 | 1/2010 | Chen et al. | | |
| 2010/0199684 A1 * | 8/2010 | Rice | ............... | F23R 3/60 29/888 |
| 2014/0255181 A1 * | 9/2014 | Ress, Jr. | ............... | F04D 29/083 415/230 |
| 2014/0260289 A1 * | 9/2014 | Graves | ............... | F04D 29/547 60/751 |
| 2022/0019861 A1 * | 1/2022 | Durr | ............... | G16H 30/20 |
| 2022/0073207 A1 * | 3/2022 | Pattee | ............... | B64D 13/00 |

* cited by examiner

ACTIVE BOUNDARY LAYER CONTROL IN DIFFUSER

TECHNICAL FIELD

The present disclosure relates generally to combustors in turbine engines and in particular to a diffuser in combustors of turbine engines.

BACKGROUND

A gas turbine engine generally includes a core, and the core of the gas turbine engine generally includes, in serial flow order, a compressor section, a combustion section, a turbine section, and an exhaust section. A flow of compressed air is provided from the compressor section to the combustion section, wherein the compressed air is mixed with fuel and ignited to generate combustion gases. The combustion gases flow through the turbine section, driving the core.

An igniter is provided within the combustion section or combustor, attached to a casing within the combustion section and extending to or through, e.g., a combustion liner at least partially defining a combustion chamber. Certain gas turbine engines utilize nontraditional high temperature materials, such as ceramic matrix composite (CMC) materials for the combustion liner. Such CMC materials may generally be better capable of withstanding the extreme temperatures within the combustion chamber. The igniter may be movably attached to the combustion liner using a mounting assembly. The mounting assembly may allow for movement of the igniter relative to the combustion liner.

A diffuser is also provided within the combustion section or combustor. The diffuser is configured to decelerate flow of air and convert the velocity of air into to a rise in static pressure. Efficient conversion of velocity to pressure is used to reduce overall system pressure loss. In some cases, more total air pressure may be needed to supply flow to the combustor swirler to control emissions and durability.

BRIEF SUMMARY

An aspect of the present disclosure is to provide a combustor for a turbine engine. The combustor includes an outer liner, an inner liner and a dome that together define a combustion chamber; a diffuser positioned upstream of the combustion chamber, the diffuser being configured to receive air flow from a compressor section and to provide a flow of compressed air to the combustion chamber; and an outer cowl and an inner cowl located upstream of the combustion chamber, the outer cowl and the inner cowl being configured to direct a portion of air flow from the diffuser to the combustion chamber. The diffuser is configured to output air flow having an amount of air pressure maximized at a center of the air flow so as to optimize total air pressure fed to the combustion chamber through the dome.

Another aspect of the present disclosure is to provide a turbine engine including (A) a compressor section configured to generate compressed air; (B) a turbine section located downstream of the compressor section; and (C) a combustion section disposed between the compressor section and the turbine section, the combustion section including a combustor. The combustor includes (a) an outer liner, an inner liner and a dome which together define a combustion chamber; (b) a diffuser positioned upstream of the combustion chamber, the diffuser being configured to receive air flow from the compressor section and to provide a flow of compressed air to the combustion chamber; and (c) an outer cowl and an inner cowl located upstream of the combustion chamber, the outer cowl and the inner cowl being configured to direct a portion of air flow from the diffuser to the combustion chamber. The diffuser is configured to output air flow having an amount of air pressure maximized at a center of the air flow so as to optimize total air pressure fed to the combustion chamber through the dome.

A further aspect of the present disclosure is to provide a method of controlling air flow in a combustor, the combustor having a diffuser, a dome and a combustion chamber. The method includes 1) injecting compressed air from a compressor section upstream of the diffuser into the diffuser of the combustor; 2) outputting air flow from the diffuser; and 3) optimizing an amount of pressure of air so as to maximize a pressure of the air flow at a center of the air flow so as to optimize total air pressure fed to the combustion chamber of the combustor through the dome of the combustor. The optimizing of the amount of pressure of air includes varying an amount of air flow escaping at edges of the air flow.

Additional features, advantages, and embodiments of the present disclosure are set forth or apparent from consideration of the following detailed description, drawings, and claims. Moreover, it is to be understood that both the foregoing summary of the present disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the present disclosure are discussed in detail below. While specific embodiments are discussed, this is done for illustration purposes only. A person skilled in the relevant art will recognize that other components and configurations may be used without departing from the spirit and scope of the present disclosure.

Current diffuser configurations are limited in terms of control of and/or the ability to vary the air boundary layer reaching the combustion zone and/or air pressure feed to different parts of the combustion system. As a result, it is desirable to control the diffuser boundary layer by injection of air or moving surfaces which can force more total pressure air to the dome of the combustor. Design features of various embodiments of the combustor include, but not limited to: (1) moving trip fences in diffuser walls to increase total pressure at center, (2) continuous diffuser passage to cowl, with passive or actuated scoops to feed liners and turbine, (3) tri-pass diffuser with center passage designed to maximize total pressure feed to swirlers in some operating conditions, and (4) rotating actuation system.

One benefit of the configurations of the present combustor according to embodiments of the present disclosure is to provide additional total pressure feed to swirler, which ultimately can reduce pollutant emissions such as NOx and smoke. This is especially desirable in engines designed for supersonic cruise since these engines operate at high T3, low P3 and high fuel-air ratio-optimal conditions to generate high NOx and smoke. There may also be other benefits, for example, improving overall dome durability due to increased total pressure feed to cooling passages. However, care is taken to ensure the system can still provide adequate pressure drop for liners and turbine cooling.

Reference will now be made in detail to present embodiments of the present disclosure, one or more examples of which are illustrated in the accompanying drawings. The detailed description uses numerical and letter designations to refer to features in the drawings. Like or similar designations in the drawings and description have been used to refer to like or similar parts of the present disclosure. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
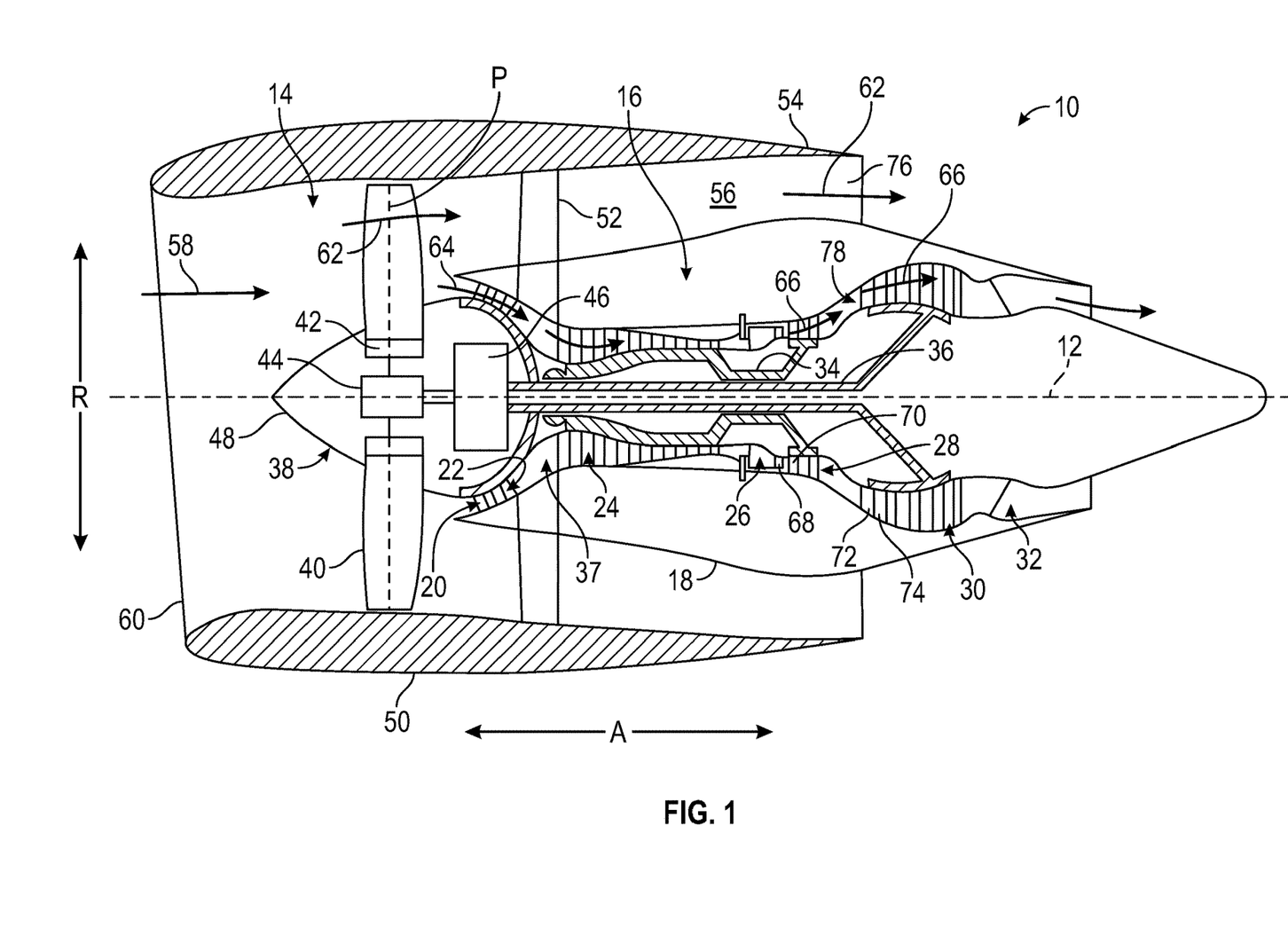
FIG. 1 is a schematic cross-sectional view of a turbine engine, according to an embodiment of the present disclosure.

Referring now to the drawings, wherein identical numerals indicate the same elements throughout the figures, FIG. 1 is a schematic cross-sectional view of a gas turbine engine, according to an embodiment of the present disclosure. More particularly, for the embodiment of FIG. 1, the gas turbine engine is a high-bypass turbofan engine 10, referred to herein as "turbofan engine 10." As shown in FIG. 1, the turbofan engine 10 defines an axial direction A (extending parallel to a longitudinal centerline 12 provided for reference) and a radial direction R, generally perpendicular to the axial direction A. The turbofan engine 10 includes a fan section 14 and a core turbine engine 16 disposed downstream from the fan section 14. The term "downstream" is used herein in reference to air flow direction 58.

The core turbine engine 16 depicted generally includes an outer casing 18 that is substantially tubular and that defines an annular inlet 20. The outer casing 18 encases, in serial flow relationship, a compressor section including a booster or low pressure (LP) compressor 22 and a high pressure (HP) compressor 24, a combustion section 26, a turbine section including a high pressure (HP) turbine 28 and a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and jet exhaust nozzle section 32 together define a core air flow path 37.

For the embodiment depicted, the fan section 14 includes a fan 38 with a variable pitch having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 (longitudinal axis) by LP shaft or spool 36 across a power gear box 46. The power gear box 46 includes a plurality of gears for adjusting or controlling the rotational speed of the fan 38 relative to the LP shaft or spool 36 to a more efficient rotational fan speed.

The disk 42 is covered by rotatable front hub 48 aerodynamically contoured to promote an air flow through the plurality of fan blades 40. Additionally, the fan section 14 includes an annular fan casing or nacelle 50 that circumferentially surrounds the fan 38 and/or at least a portion of the core turbine engine 16. The nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass air flow passage 56 therebetween.

During operation of the turbofan engine 10, a volume of air flow 58 enters the turbofan engine 10 in air flow direction 58 through an associated inlet 60 of the nacelle 50 and/or the fan section 14. As the volume of air passes across the fan blades 40, a first portion of the air as indicated by arrows 62 is directed or routed into the bypass air flow passage 56 and a second portion of the air as indicated by arrow 64 is directed or routed into the core air flow path 37, or, more specifically, into the LP compressor 22. The ratio between the first portion of air indicated by arrows 62 and the second portion of air indicated by arrows 64 is commonly known as a bypass ratio. The pressure of the second portion of air indicated by arrows 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass air flow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the turbofan engine 10 depicted in FIG. 1 is by way of example only, and that, in other exemplary embodiments, the turbofan engine 10 may have any other suitable configuration. It should also be appreciated, that, in still other exemplary embodiments, aspects of the present disclosure may be incorporated into any other suitable gas turbine engine. For example, in other exemplary embodiments, aspects of the present disclosure may be incorporated into, e.g., a turboshaft engine, a turboprop engine, a turbocore engine, a turbojet engine, etc.

Figure 2:
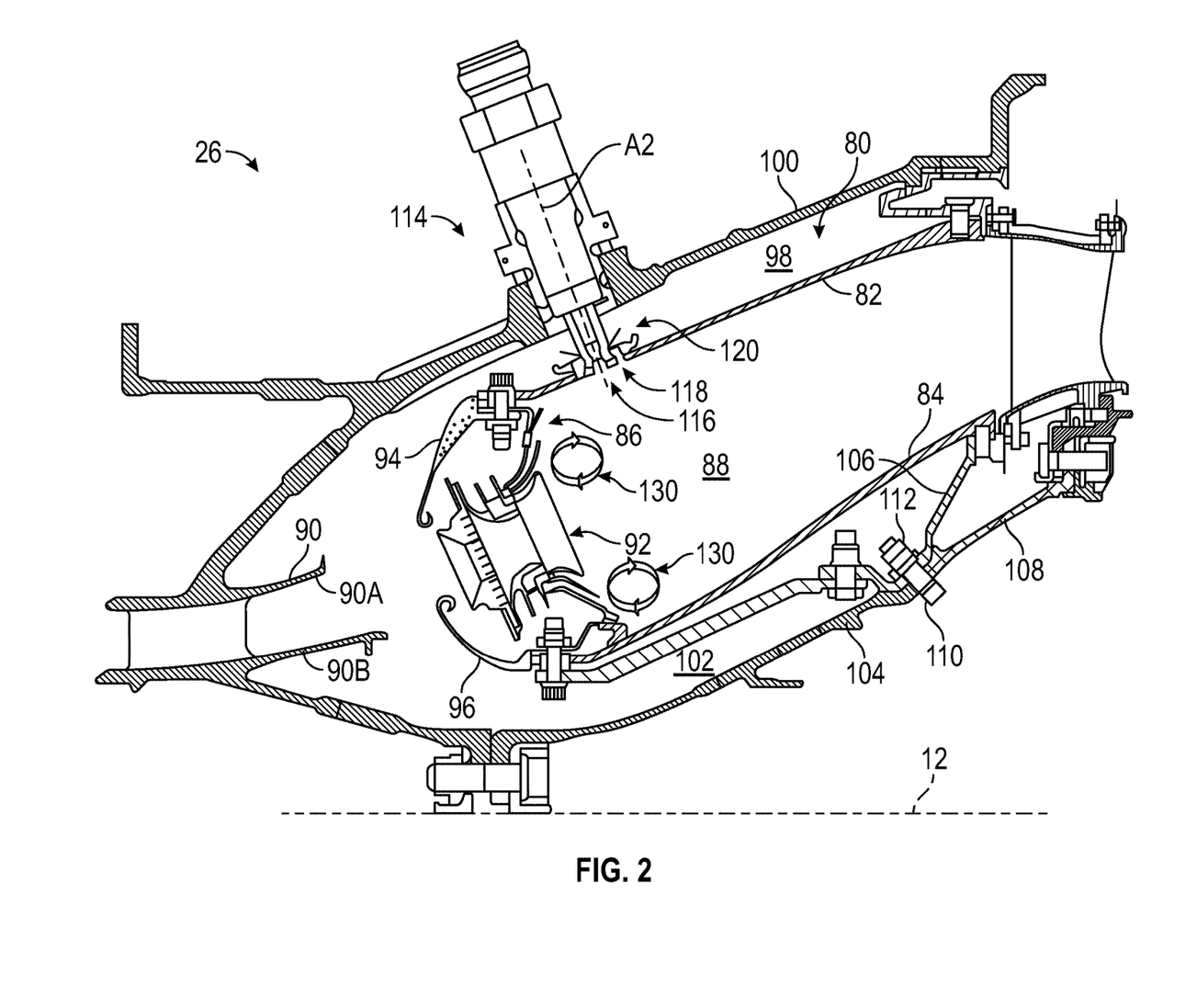
FIG. 2 is a schematic, cross-sectional view of the combustion section of the turbine engine of FIG. 1, according to an embodiment of the present disclosure.

FIG. 2 is a schematic, cross-sectional view of the combustion section 26 of the turbofan engine 10 of FIG. 1, according to an embodiment of the present disclosure. The combustion section 26 generally includes a combustor 80 that generates the combustion gases discharged into the turbine section, or, more particularly, into the HP turbine 28. The combustor 80 includes an outer liner 82, an inner liner 84, and a dome 86. The outer liner 82, inner liner 84, and dome 86 together define a combustion chamber 88. In addition, a diffuser 90 is positioned upstream of the combustion chamber 88. The diffuser 90 has an outer diffuser wall 90A and an inner diffuser wall 90B. The inner diffuser wall 90B is closer to longitudinal centerline 12. The diffuser 90 receives an air flow from the compressor section and provides a flow of compressed air to the combustor 80. In an embodiment, the diffuser 90 provides the flow of compressed air to a single circumferential row of fuel/air mixers 92. In an embodiment, the dome 86 of the combustor 80 is configured as a single annular dome, and the circumferential row of fuel/air mixers 92 are provided within openings formed in the dome (air feeding dome or combustor dome) 86. However, in other embodiments, a multiple annular dome can also be used.

In an embodiment, the diffuser 90 can be used to slow the high speed, highly compressed, air from a compressor (not shown) to a velocity optimal for the combustor. Furthermore, the diffuser 90 can also be configured to limit the flow distortion as much as possible by avoiding flow effects like boundary layer separation. Like most other gas turbine engine components, the diffuser 90 is generally designed to be as light as possible to reduce weight of the overall engine.

A fuel nozzle (not shown) provides fuel to fuel/air mixers 92 depending upon a desired performance of the combustor 80 at various engine operating states. In the embodiment shown in FIG. 2, an outer cowl (e.g., annular cowl) 94 and an inner cowl (e.g., annular cowl) 96 are located upstream of the combustion chamber 88 so as to direct air flow into fuel/air mixers 92. The outer cowl 94 and inner cowl 96 may also direct a portion of the flow of air from the diffuser 90 to an outer passage 98 defined between the outer liner 82 and an outer casing 100 and an inner passage 102 defined between the inner liner 84 and an inner casing 104. In addition, an inner support cone 106 is further shown as being connected to a nozzle support 108 using a plurality of bolts 110 and nuts 112. However, other combustion sections may include any other suitable structural configuration.

In some embodiments, the outer liner 82 and inner liner 84 can be formed of a Ceramic Matrix Composite (CMC), which is a non-metallic material having high temperature capability. Exemplary composite materials utilized for such liners include silicon carbide, silicon, silica or alumina matrix materials, and combinations thereof. Typically, ceramic fibers are embedded within the matrix such as oxidation stable reinforcing fibers including monofilaments like sapphire and silicon carbide, as well as rovings and yarn including silicon carbide, alumina silicates, and chopped whiskers and fibers, and, optionally, ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about $1.3 \times 10^{-6}$ in/in/° F. to about $3.5 \times 10^{-6}$ in/in/° F. in a temperature range of 1000° F. to 1200° F.

By contrast, other components of the combustor 80 or combustion section 26, such as the outer casing 100, inner casing 104, and other support members of the combustion section 26, may be formed of a metal, such as a nickel-based superalloy (which may have a coefficient of thermal expansion of about 8.3 to $8.6 \times 10^{-6}$ in/in/° F. in a temperature range of approximately 1000° F. to 1200° F.) or cobalt-based superalloy (which may have a coefficient of thermal expansion of about 9.2 to $9.4 \times 10^{-6}$ in/in/° F.). Outer liner 82 and inner liner 84 may support extreme temperature environment presented in combustion chamber 88.

The combustor 80 is also provided with an igniter 114. The igniter 114 is provided to ignite the fuel/air mixture supplied to combustion chamber 88 of the combustor 80. The igniter 114 is attached to the outer casing 100 of the combustor 80 in a substantially fixed manner. Additionally, the igniter 114 extends generally along an axial direction A2, defining a distal end 116 that is positioned proximate to an opening in a combustor member of the combustion chamber 88. The distal end 116 is positioned proximate to an opening 118 within the outer liner 82 of the combustor 80 to the combustion chamber 88.

The outer liner 82 and inner liner 84 have a plurality of holes (not shown) provided therein. The holes are distributed along a surface of the outer liner 82 and inner liner 84 to allow air to enter to the combustion chamber 88. Alternatively, the outer liner 82 and inner liner 84 can be made from a porous material. The outer liner 82 and inner liner 84 contain the combustion process and introduce the various air flows (intermediate, dilution, and cooling) into the combustion chamber 88.

In an embodiment, the dome 86 of the combustor 80 together with the outer liner 82 and inner liner 84 define a swirler 130. The air flows through the swirler 130 as the air enters the combustion chamber 88. The role of the dome 86 and swirler 130 is to generate turbulence in the air flow to rapidly mix the air with the fuel. The swirler establishes a local low pressure zone that forces some of the combustion products to recirculate, as illustrated in FIG. 2, creating high turbulence. The dome 86 and swirler 130 are designed so as not to generate more turbulence than is needed to sufficiently mix the fuel and air.

Figure 3:
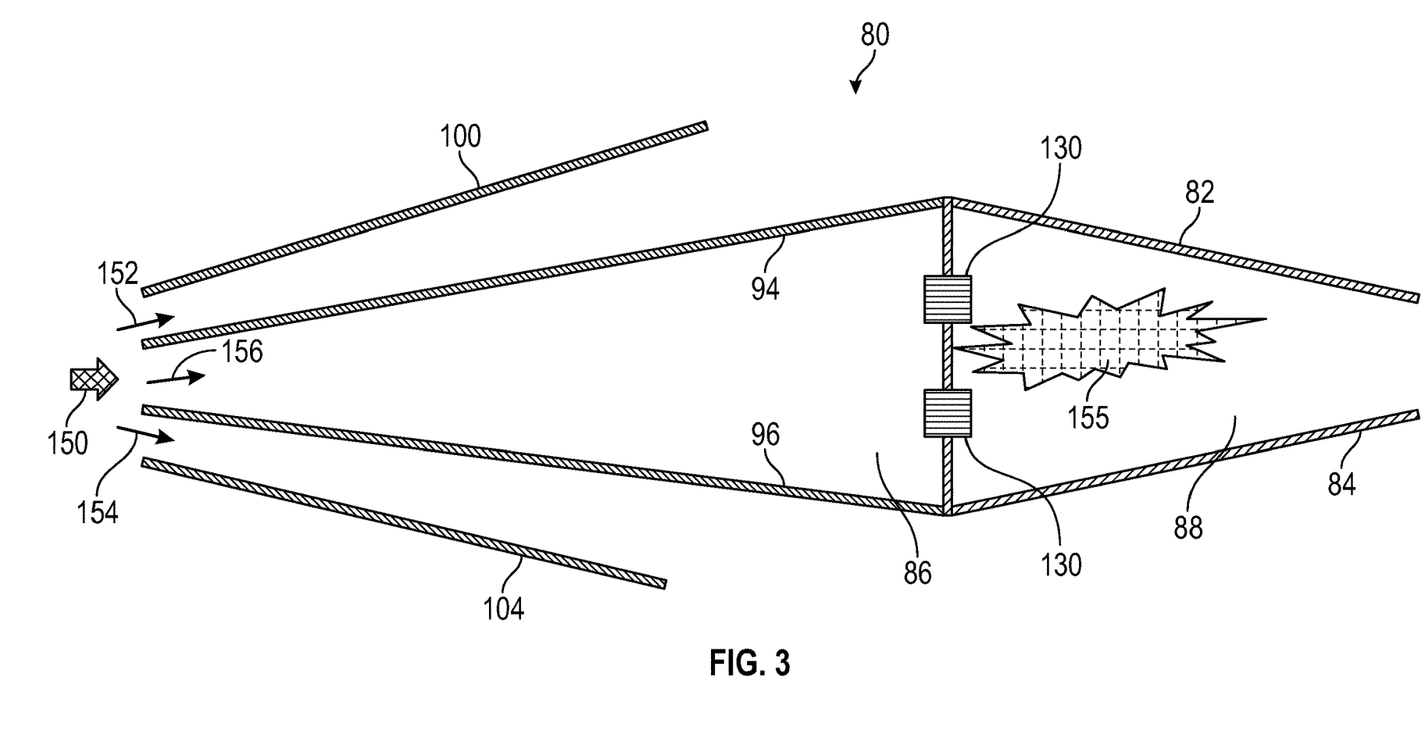
FIG. 3 is a schematic diagram representing an outer cowl and an inner cowl together with an outer casing and an inner casing defining a flow of air through the swirler towards the combustion zone within the combustion chamber, according to an embodiment of the present disclosure.

FIG. 3 is a schematic diagram representing outer cowl 94 and inner cowl 96 together with outer casing 100 and inner casing 104 defining a flow of air through the swirler 130 towards the combustion zone 155 within the combustion chamber 88, according to an embodiment of the present disclosure. In this embodiment, a flow of air 150 from the diffuser 90 (not shown in FIG. 3) is divided into three air flow portions 152, 154, and 156 by the geometry of the outer cowl 94, inner cowl 96, outer casing 100 and inner casing 104. Air flow portion 152 passes between outer casing 100 and outer cowl 94. Air flow portion 154 passes between inner casing 104 and inner cowl 96. Air flow portion 156 passes between the outer cowl 94 and inner cowl 96 into the dome 86 and through the swirler 130 into the combustion zone 155 within the combustion chamber 88. Air flow portions 152 and 154 are lateral air flows and air flow portion 156 is a center air flow. This configuration is called "a tri-pass diffuser" as two lateral air flows 152 and 154 and center air flow 156 are generated after air is output by the diffuser 90. The amount of air in the center air flow 156 and the amount of air in the lateral air flows 152 and 154 can be controlled and adjusted as desired according to desired energy output by the combustor 80 and ultimately by the operating condition of the turbine engine 10 (shown in FIG. 1). For example, the amount of air in the center air flow 156 can be controlled to optimize total air pressure fed to the swirler 130 through the dome 86 of combustor 80. In this embodiment, air distribution is optimized by providing airflow fed through the connected diffuser 90 and cowls 94, 96 by capturing the total pressure feed, rather than the static pressure feed. This geometry eliminates pressure losses associated with an airflow rapid expansion downstream of the diffuser exit.

Figure 4:
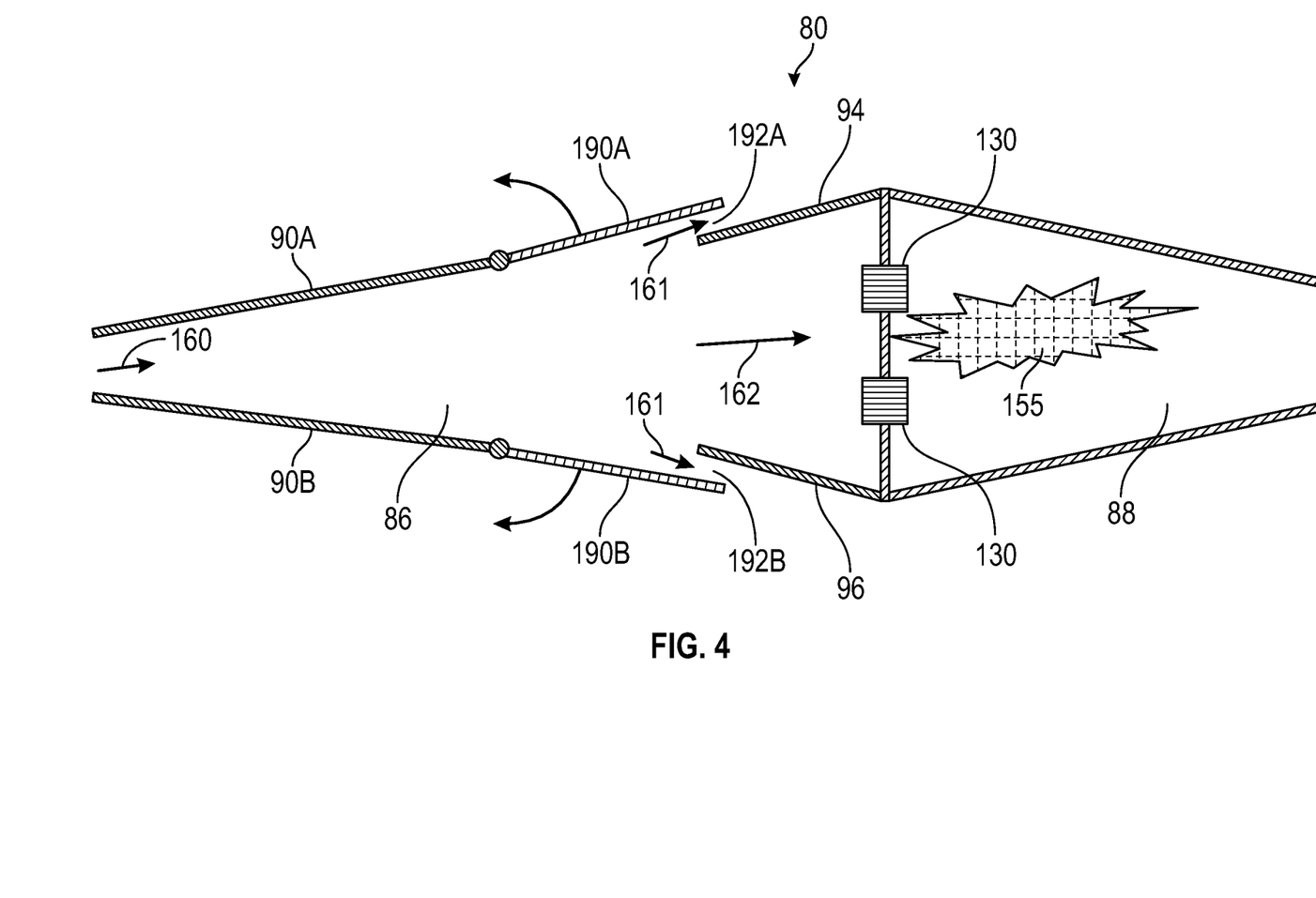
FIG. 4 is a schematic diagram representing an outer door and an inner door (e.g., flaps) between an outer diffuser wall and an outer cowl and between an inner diffuser wall and an inner cowl, according to an embodiment of the present disclosure.

FIG. 4 is a schematic diagram representing outer door 190A and inner door 190B (e.g., flaps) between outer diffuser wall 90A and outer cowl 94 and between inner diffuser wall 90B and inner cowl 96, according to an embodiment of the present disclosure. In an embodiment, outer door 190A is provided on the outer diffuser wall 90A and inner door 190B is provided on the inner diffuser wall 90B, In an embodiment, the outer door 190A is provided between the outer diffuser wall 90A of the diffuser 90 and outer cowl 94. In addition, an inner door 190B is provided between inner diffuser wall 90B of the diffuser 90 and inner cowl 96. In an embodiment, the outer door 190A is hinge-mounted to outer diffuser wall 90A of the diffuser 90. Therefore, the outer door 190A pivots or rotates to open/close an opening 192A between the outer diffuser wall 90A and the outer cowl 94. In an embodiment, the inner door 190B is hinge-mounted to inner diffuser wall 90B of the diffuser 90. Therefore, the inner door 190B also pivots or rotates to open/close an opening 192B between the inner diffuser wall 90B and the inner cowl 96. Air flow 160 flowing towards the swirler 130 can be controlled by actuation (e.g., controlled opening or closing) of the outer door 190A, or the inner door 190B, or both. Although, in FIG. 4, the outer door 190A and inner door 190B are shown to be rotatable, other types of doors can also be used such as slidable doors, or the like. For example, when the outer door 190A and inner door 190B are opened as shown in FIG. 4, air flow portion 161 of the air flow 160 would escape through the openings 192A and 192B and, thus, only remaining air flow portion 162 of the air flow 160 continues flowing towards swirler 130 or combustion chamber 88. In an embodiment, the outer door 190A or the inner door 190B, or both can be controlled to control a level of opening or closing of the opening 192B between the inner diffuser wall 90B and the inner cowl 96 or the opening 192A between the outer diffuser wall 90A and the outer cowl 94 to control an amount of air flow feeding the dome 86 and swirler 130 and, thus, the combustion chamber 88. By controlling the level of opening/closing of the outer door 190A and/or inner door 190B, the amount of air flow portion 161 that escapes through the openings 192A and 192B can be controlled and, thus, the amount of air flow 162 reaching the swirler 130 and ultimately the combustion chamber 88 can also be controlled. As it can be appreciated, outer door 190A and inner door 190B can be actuated independently of each other. For example, outer door 190A can be opened to a certain level while inner door 190B can be left closed or opened to another level, or vice versa. For example, when the outer door 190A, the inner door 190B or both are partially open, the first air flow portion 161 of the air flow 160 escapes through the opening 192B between the inner diffuser wall 90B and the inner cowl 96, and/or through the opening 192A between the outer diffuser wall 90A and the outer cowl 94, and the second air flow portion 162 of the air flow 160 (e.g., dominant air flow portion) continues towards the combustion chamber 88.

Figure 5A:
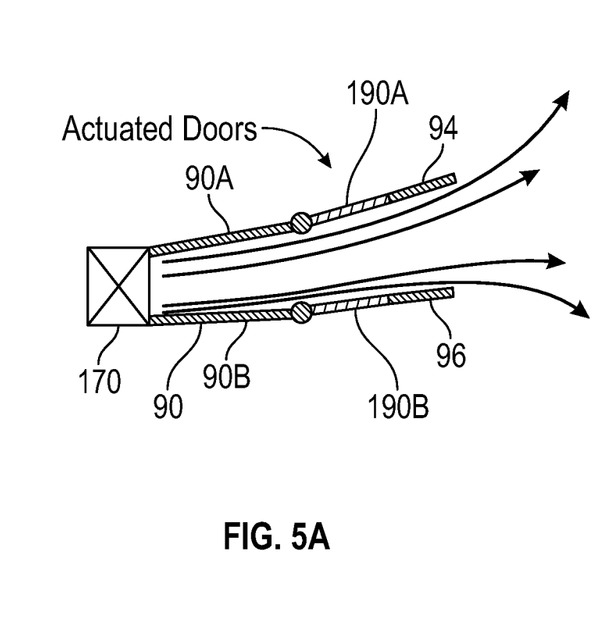
FIG. 5A is a schematic diagram illustrating a configuration where an outer door and an inner door are closed, according to an embodiment of the present disclosure.
Figure 5B:
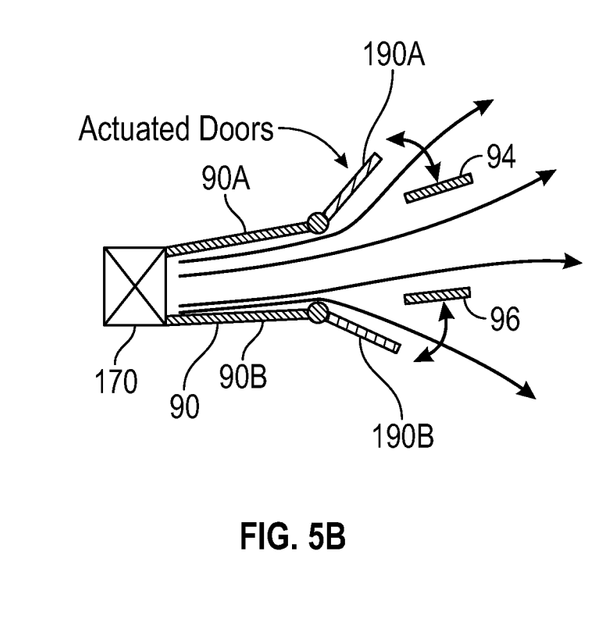
FIG. 5B is a schematic diagram illustrating a configuration where an outer door and an inner door are opened, according to an embodiment of the present disclosure.

FIG. 5A is a schematic diagram illustrating a configuration where outer door 190A and inner door 190B are closed, according to an embodiment of the present disclosure. FIG. 5B is a schematic diagram illustrating a configuration where outer door 190A and inner door 190B are opened, according to an embodiment of the present disclosure. FIGS. 5A and 5B also depict schematically the flow of air from the diffuser 90 to the outer cowl 94 and inner cowl 96. FIGS. 5A and 5B also show an end 170 of air compressor that leads to the diffuser 90. By varying the opening of the outer door 190A and/or inner door 190B, the flow of air reaching the swirler 130 and combustion zone 155 between the outer liner 82 and inner liner 84 can be controlled and/or varied/tuned for optimum operation and performance of the combustor 80. In an embodiment, outer door 190A and inner door 190B can be similar to variable block vane (VBV) doors. The air flow from the diffuser 90 can be diverted in order to divert air flows into passages through the doors versus dominantly into the dome towards the swirler 130.

With advanced cycles, combustor optimization (e.g., flowsplits) can be pinched between key design points. For example, a high overall pressure ratio (OPR), high exhaust gas temperature (EGT) cycle can also have a very efficient (i.e., low fuel air ratio (FAR)) cruise cycle condition. Air flow splits can be a high dome split at takeoff (T/O) but lower at cruise to manage landing/takeoff (LTO) nitrous oxides (NOx) versus cruise combustion efficiency.

Figure 6A:
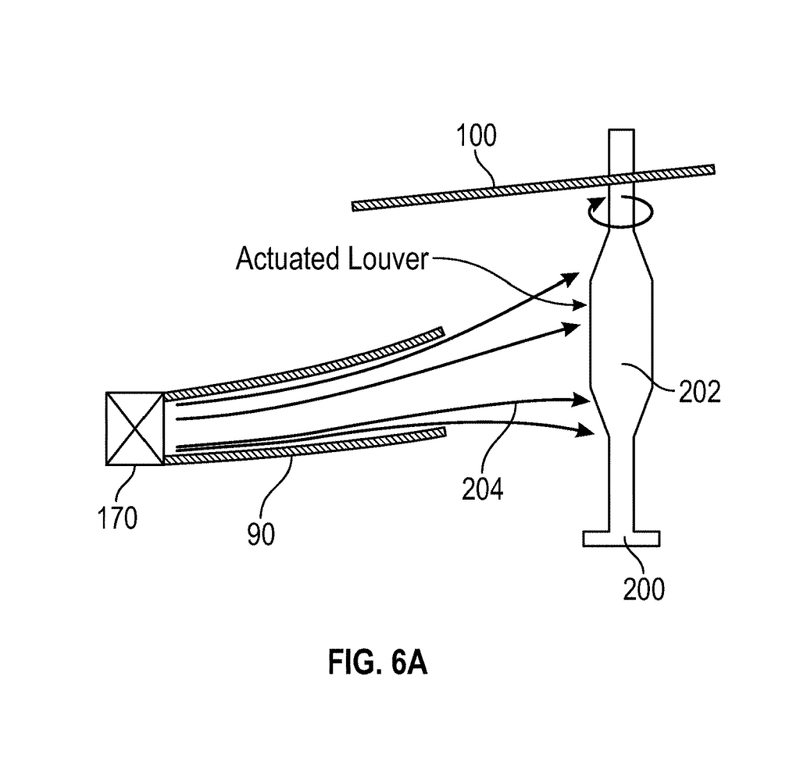
FIG. 6A is a schematic diagram illustrating a configuration using a louver, the louver being in an open or substantially not impeding air flow condition around a central position of the air flow, according to an embodiment of the present disclosure.
Figure 6B:
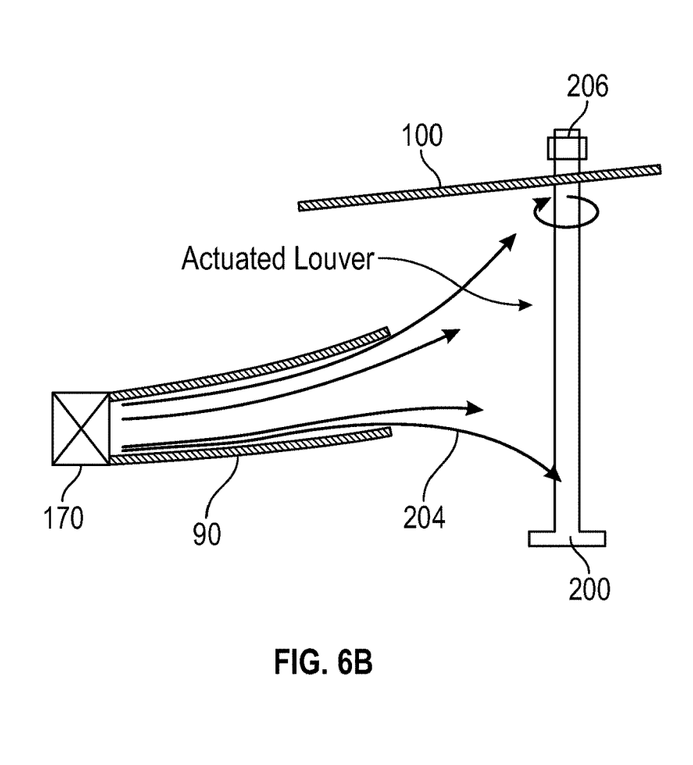
FIG. 6B is a schematic diagram illustrating a configuration using a louver (e.g., an actuatable louver), the louver being in a closed or impeding air flow condition, according to another embodiment of the present disclosure.

FIG. 6A is a schematic diagram illustrating a configuration using a louver 200, the louver 200 being in an open or substantially not impeding air flow condition around a central position of the air flow 204, according to an embodiment of the present disclosure. FIG. 6B is a schematic diagram illustrating a configuration using louver 200 (e.g. actuatable louver), the louver 200 being in a closed or impeding air flow condition, according to another embodiment of the present disclosure. In an embodiment, as shown in FIGS. 6A and 6B, the louver 200 can be rotatably mounted to outer casing 100. In the configuration depicted in FIG. 6A, the louver 200 is rotated such that opening 202 in the louver 200 located at a central position relative to the air flow 204 is facing the air flow 204 output by the diffuser 90. As a result, a greater portion of the air flow 204 passes through the opening 202 substantially unimpeded towards the swirler 130 (shown in FIGS. 2, 3, and 4) at the central position of the air flow 204. In the configuration shown in FIG. 6A, the opening 202 of the louver 200 is located substantially at a central position relative to the direction of air flow 204 such that a larger portion of air flow 204 passes through opening 202 unimpeded in the center position of the air flow 204, but slightly impeded at the edges of the opening 202 at the edges of the air flow 204. In the configuration depicted in FIG. 6B, the louver 200 is rotated such that an opening 202 in the louver 200 is facing away from the air flow 204 output by the diffuser 90. As a result, a smaller or minimal portion of the air flow 204 passes through the opening 202 of the louver 200. For example, the louver 200 can be rotated using a rotating arm 206. However, as may be appreciated, other means for rotating the louver 200 can also be used.

Figure 7A:
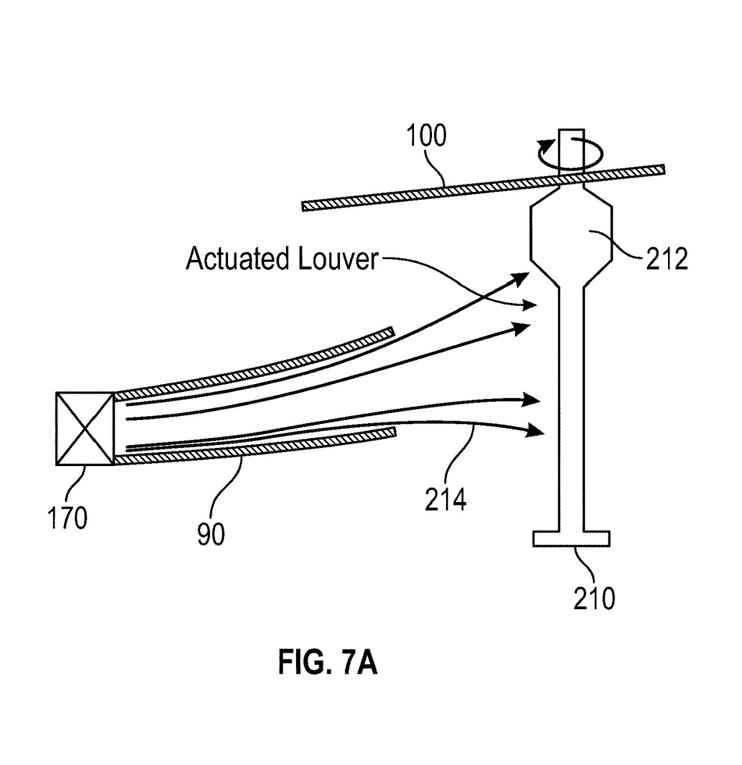
FIG. 7A is a schematic diagram illustrating a configuration using a louver, the louver being in an open or substantially not impeding air flow condition towards an edge position of air flow, according to another embodiment of the present disclosure.
Figure 7B:
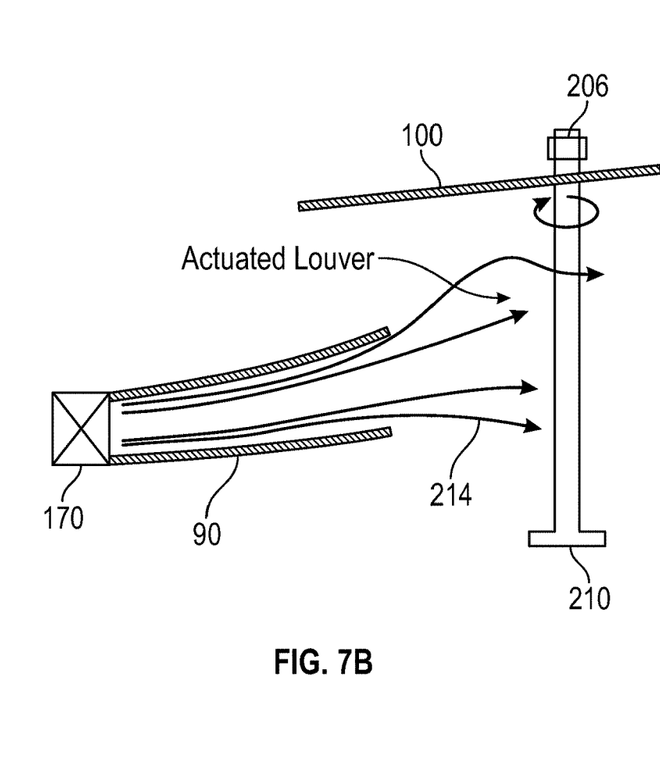
FIG. 7B is a schematic diagram illustrating a configuration using a louver (e.g., an actuatable louver), the louver being in a closed or impeding air flow condition, according to another embodiment of the present disclosure.

FIG. 7A is a schematic diagram illustrating a configuration using louver 210, the louver 210 being in an open or substantially not impeding air flow condition towards an edge position of air flow 214, according to another embodiment of the present disclosure. FIG. 7B is a schematic diagram illustrating a configuration using louver 210 (e.g., actuatable louver), the louver 210 being in a closed or impeding air flow condition, according to another embodiment of the present disclosure. In an embodiment, as shown in FIGS. 7A and 7B, the louver 210 can be rotatably mounted to outer casing 100. In the configuration depicted in FIG. 7A, the louver 210 is rotated such that an opening 212 in the louver 210 is facing an edge of the air flow 214 output by the diffuser 90. As a result, a greater portion of the air flow 214 passes through the opening 212 at the edge position of the air flow 214 substantially unimpeded, but away from the swirler 130, while air flow 214 in the central position is impeded. In the configuration shown in FIG. 7A, the opening 212 of the louver 210 is located substantially at an edge position relative to the direction of flow of air flow 214 such that a greater portion of air flow 214 passes through opening 212 unimpeded at the edge position of the air flow 214, but impeded at the center position of the air flow 214. In the configuration depicted in FIG. 7B, the louver 210 is rotated such that an opening 212 in the louver 210 is facing away from the air flow 214 output by the diffuser 90. As a result, a lesser or minimal portion of the air flow 214 passes through the opening 212 of the louver 210. For example, the louver 210 can be for rotated using a rotating arm 216. However, it may be appreciated other means for rotating the louver 210 can also be used.

As may be appreciated, the configurations of the louver 200 shown in FIGS. 6A and 6B can be combined with the configuration of the louver shown in FIGS. 7A and 7B. For example, louver 200 can be used to control an amount of air flow passing at a central position of the air flow, while louver 200 can be used to control an amount of air flow passing at an edge of the air flow. This allows for increased or refined control of the air flow and, thus, increased tunability of the energy output of the combustor.

Figure 8:
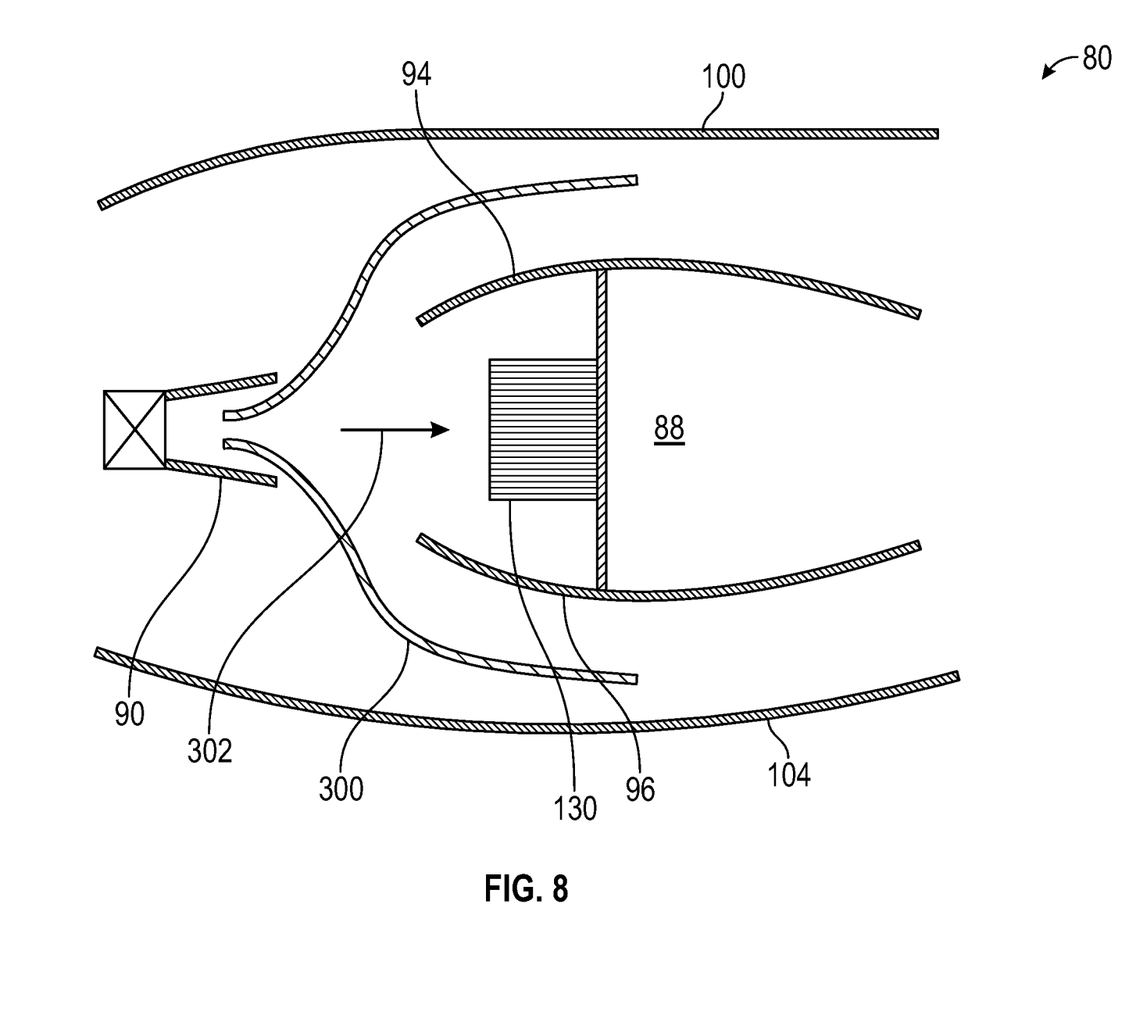
FIG. 8 is a schematic representation of a combustor showing the boundary layer of air flow when using a specific air pressure condition at the compressor upstream of the diffuser, according to an embodiment of the present disclosure.

FIG. 8 is a schematic representation of a combustor 80 showing the boundary layer of air flow when using a specific air pressure condition at the compressor upstream of the diffuser, according to an embodiment of the present disclosure. In the embodiment shown in FIG. 8, air pressure from the compressor (not shown) upstream of the diffuser 90 is controlled to control a boundary layer of air flow 300 so that the air flow 300 is concentrated towards a central position 302 to maintain a strong core so as to generate the air flow with a concentrated center air profile to capture total pressure feed to dome 86 through the outer cowl 94 and inner cowl 96 in order to increase fuel-air mixing in the combustion chamber 88. In an embodiment, a laminar boundary layer air flow is generated to create less skin friction so as to maintain a strong central pressure profile, so that that a greater amount of air flow 300 reaches the swirler 130 and, ultimately, combustion chamber 88.

One benefit of configurations of the present combustor according to embodiments of the present disclosure is to provide additional total pressure feed to swirler 130, which ultimately can reduce pollutant emissions such as NOx and smoke. This is especially desirable in engines designed for supersonic cruise, since these engines operate at high T3, low P3, and high fuel-air ratio-optimal conditions to generate high NOx and smoke. There may also be other benefits, for example, improving overall dome durability due to increased total pressure feed to cooling passages. However, care is taken to ensure the system can still provide adequate pressure drop for liners and turbine cooling.

A combustor for a turbine engine, the combustor comprising: an outer liner, an inner liner and a dome that together define a combustion chamber; a diffuser positioned upstream of the combustion chamber, the diffuser being configured to receive air flow from a compressor section and to provide a flow of compressed air to the combustion chamber; and an outer cowl and an inner cowl located upstream of the combustion chamber, the outer cowl and the inner cowl being configured to direct a portion of air flow from the diffuser to the combustion chamber, wherein the diffuser is configured to output air flow having an amount of air pressure maximized at a center of the air flow so as to optimize total air pressure fed to the combustion chamber through the dome.

The combustor according to the preceding claim, wherein the diffuser comprises an outer diffuser wall and an inner diffuser wall, an outer door being provided on the outer diffuser wall and an inner door provided on the inner diffuser wall, wherein the outer door is configured to open or to close an opening between the outer diffuser wall of the diffuser and the outer cowl, and wherein the inner door is configured to open or to close another opening between the inner diffuser wall of the diffuser and the inner cowl.

The combustor according to any of the preceding claims, wherein the outer door is hinge-mounted to the outer diffuser wall and the outer door is configured to rotate to open or to close the opening between the outer diffuser wall and the outer cowl, and wherein the inner door is hinge-mounted to the inner diffuser wall and the inner door is configured to rotate to open or to close the opening between the inner diffuser wall and the inner cowl.

The combustor according to any of the preceding claims, wherein at least one of the outer door and the inner door, are controllable to control a level of opening or closing of the opening between the inner diffuser wall and the inner cowl or the opening between the outer diffuser wall and the outer cowl to control an amount of air flow feeding the dome and swirler.

The combustor according to any of the preceding claims, wherein, when at least one of the outer door and the inner door are partially open, a first portion of the air flow escapes through the opening between the inner diffuser wall and the inner cowl or through the opening between the outer diffuser wall and the outer cowl and a dominant second portion of the air flow continues towards the combustion chamber.

The combustor according to any of the preceding claims, further comprising a louver disposed downstream of the diffuser, wherein the louver is configured and arranged to control an amount of air flow reaching the combustion chamber.

The combustor according to any of the preceding claims, wherein the louver comprises an opening located at a central position relative to the air flow so that, when facing the air flow that is output by the diffuser, a greater portion of the air flow passes through the opening substantially unimpeded in a center position of the air flow towards the combustion chamber and impeded at edges of the air flow.

The combustor according to any of the preceding claims, wherein the louver comprises an opening located at an edge position relative to the air flow so that, when facing the air flow that is output by the diffuser, a greater portion of the air flow passes through the opening substantially unimpeded at the edge position away from the combustion chamber and impeded at a central position of the air flow.

The combustor according to any of the preceding claims, wherein the air flow output by the diffuser is generated by an air compressor in the compressor section upstream of the diffuser, wherein air pressure from the compressor section is controlled to control a boundary layer of the air flow output by the diffuser to generate the air flow with a concentrated center air profile so as to increase fuel-air mixing in the combustion chamber.

A turbine engine comprising: (A) a compressor section configured to generate compressed air; (B) a turbine section located downstream of the compressor section; and (C) a combustion section disposed between the compressor section and the turbine section, the combustion section including a combustor comprising: (a) an outer liner, an inner liner and a dome which together define a combustion chamber; (b) a diffuser positioned upstream of the combustion chamber, the diffuser being configured to receive air flow from the compressor section and to provide a flow of compressed air to the combustion chamber; and (c) an outer cowl and an inner cowl located upstream of the combustion chamber, the outer cowl and the inner cowl being configured to direct a portion of air flow from the diffuser to the combustion chamber, wherein the diffuser is configured to output air flow having an amount of air pressure maximized at a center of the air flow so as to optimize total air pressure fed to the combustion chamber through the dome.

The turbine engine according to the preceding claim, further comprising an igniter extending into the combustor through an opening in the combustor, wherein the igniter is configured to ignite a fuel and air mixture supplied to the combustion chamber of the combustor.

The turbine engine according to any of the preceding claims, wherein the diffuser comprises an outer diffuser wall and an inner diffuser wall, an outer door being provided on the outer diffuser wall and an inner door provided on the inner diffuser wall, wherein the outer door is configured to open or close an opening between the outer diffuser wall of the diffuser and the outer cowl, and wherein the inner door is configured to open or to close another opening between the inner diffuser wall of the diffuser and the inner cowl.

The turbine engine according to any of the preceding claims, wherein the outer door is hinge-mounted to the outer diffuser wall and the outer door is configured to rotate to open or to close the opening between the outer diffuser wall and the outer cowl, and wherein the inner door is hinge-mounted to the inner diffuser wall and the inner door is configured to rotate to open or to close the opening between the inner diffuser wall and the inner cowl.

The turbine engine according to any of the preceding claims, wherein at least one of the outer door and the inner door are controllable to control a level of opening or closing of the opening between the inner diffuser wall and the inner cowl or the opening between the outer diffuser wall and the outer cowl to control an amount of air flow feeding the dome and swirler.

The turbine engine according to any of the preceding claims, wherein, when at least one of the outer door and the inner door are partially open, a first portion of the air flow escapes through the opening between the inner diffuser wall and the inner cowl or through the opening between the outer diffuser wall and the outer cowl and a dominant second portion of the air flow continues towards the combustion chamber.

The turbine engine according to claim 10, further comprising a louver disposed downstream of the diffuser, wherein the louver is configured and arranged to control an amount air flow reaching the combustion chamber.

The turbine engine according to any of the preceding claims, wherein the louver comprises an opening located at a central position relative to air flow so, that when facing the air flow that is output by the diffuser, a greater portion of the air flow passes through the opening substantially unimpeded in a center position of the air flow towards the combustion chamber and impeded at edges of the air flow.

The turbine engine according to any of the preceding claims, wherein the louver comprises an opening located at an edge position relative to air flow, so that when facing the air flow that is output by the diffuser, a greater portion of the air flow passes through the opening substantially unimpeded at the edge position away from the combustion chamber and impeded at a central position of the air flow.

The turbine engine according to any of the preceding claims, wherein the compressor section comprises an air compressor, wherein air flow output by the diffuser is generated by the air compressor in the compressor section upstream of the diffuser, wherein air pressure from the compressor section is controlled to control a boundary layer of the air flow output by the diffuser to generate the air flow with a concentrated center air profile so as to increase fuel-air mixing in the combustion chamber.

A method of controlling air flow in a combustor, according to any of the preceding claims, the combustor having a diffuser, a dome and a combustion chamber, the method comprising: injecting compressed air from a compressor section upstream of the diffuser into the diffuser of the combustor; outputting air flow from the diffuser; and optimizing an amount of pressure of air so as to maximize a pressure of the air flow at a center of the air flow so as to optimize total air pressure fed to the combustion chamber of the combustor through the dome of the combustor, wherein the optimizing of the amount of pressure of air comprises varying an amount of air flow escaping at edges of the air flow.

Although the foregoing description is directed to the preferred embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

The invention claimed is:

1. A combustor for a turbine engine, the combustor comprising:
   an outer liner, an inner liner and a dome that together define a combustion chamber;
   a diffuser positioned upstream of the combustion chamber, the diffuser being configured to receive air flow from a compressor section and to provide a flow of compressed air to the combustion chamber; and
   an outer cowl and an inner cowl located upstream of the combustion chamber, the outer cowl and the inner cowl being configured to direct a portion of air flow from the diffuser to the combustion chamber,
   wherein the diffuser is configured to output air flow having an amount of air pressure maximized at a center of the air flow so as to optimize total air pressure fed to the combustion chamber through the dome,
   wherein the diffuser comprises an outer diffuser wall and an inner diffuser wall, an outer door being provided on the outer diffuser wall and an inner door provided on the inner diffuser wall,
   wherein the outer door is configured to open or to close an opening between the outer diffuser wall of the diffuser and the outer cowl, and
   wherein the inner door is configured to open or to close another opening between the inner diffuser wall of the diffuser and the inner cowl.

2. The combustor according to claim 1,
   wherein the outer door is hinge-mounted to the outer diffuser wall and the outer door is configured to rotate to open or to close the opening between the outer diffuser wall and the outer cowl, and
   wherein the inner door is hinge-mounted to the inner diffuser wall and the inner door is configured to rotate to open or to close the opening between the inner diffuser wall and the inner cowl.

3. The combustor according to claim 1, wherein at least one of the outer door and the inner door, are controllable to control a level of opening or closing of the opening between the inner diffuser wall and the inner cowl or the opening between the outer diffuser wall and the outer cowl to control an amount of air flow feeding the dome and swirler.

4. The combustor according to claim 3, wherein, when at least one of the outer door and the inner door are partially open, a first portion of the air flow escapes through the opening between the inner diffuser wall and the inner cowl or through the opening between the outer diffuser wall and the outer cowl and a dominant second portion of the air flow continues towards the combustion chamber.

5. A combustor for a turbine engine, the combustor comprising:
   an outer liner, an inner liner and a dome that together define a combustion chamber;
   a diffuser positioned upstream of the combustion chamber, the diffuser being configured to receive air flow from a compressor section and to provide a flow of compressed air to the combustion chamber;
   an outer cowl and an inner cowl located upstream of the combustion chamber, the outer cowl and the inner cowl being configured to direct a portion of air flow from the diffuser to the combustion chamber; and
   a louver disposed downstream of the diffuser, the louver being configured and arranged to control an amount of air flow reaching the combustion chamber,
   wherein the diffuser is configured to output air flow having an amount of air pressure maximized at a center of the air flow so as to optimize total air pressure fed to the combustion chamber through the dome.

6. The combustor according to claim 5, wherein the louver comprises an opening located at a central position relative to the air flow so that, when facing the air flow that is output by the diffuser, a greater portion of the air flow passes through the opening substantially unimpeded in a center position of the air flow towards the combustion chamber and impeded at edges of the air flow.

7. The combustor according to claim 5, wherein the louver comprises an opening located at an edge position relative to the air flow so that, when facing the air flow that is output by the diffuser, a greater portion of the air flow passes through the opening substantially unimpeded at the edge position away from the combustion chamber and impeded at a central position of the air flow.

8. The combustor according to claim 1, wherein the air flow output by the diffuser is generated by an air compressor in the compressor section upstream of the diffuser, wherein air pressure from the compressor section is controlled to control a boundary layer of the air flow output by the diffuser to generate the air flow with a concentrated center air profile so as to increase fuel-air mixing in the combustion chamber.

9. A turbine engine comprising:
   (A) a compressor section configured to generate compressed air;
   (B) a turbine section located downstream of the compressor section; and
   (C) a combustion section disposed between the compressor section and the turbine section, the combustion section including a combustor comprising:
   (a) an outer liner, an inner liner and a dome which together define a combustion chamber;
   (b) a diffuser positioned upstream of the combustion chamber, the diffuser being configured to receive air flow from the compressor section and to provide a flow of compressed air to the combustion chamber; and
   (c) an outer cowl and an inner cowl located upstream of the combustion chamber, the outer cowl and the inner cowl being configured to direct a portion of air flow from the diffuser to the combustion chamber,
   wherein the diffuser is configured to output air flow having an amount of air pressure maximized at a center of the air flow so as to optimize total air pressure fed to the combustion chamber through the dome,
   wherein the diffuser comprises an outer diffuser wall and an inner diffuser wall, an outer door being provided on the outer diffuser wall and an inner door provided on the inner diffuser wall,
   wherein the outer door is configured to open or close an opening between the outer diffuser wall of the diffuser and the outer cowl, and
   wherein the inner door is configured to open or to close another opening between the inner diffuser wall of the diffuser and the inner cowl.

10. The turbine engine according to claim 9, further comprising an igniter extending into the combustor through an opening in the combustor, wherein the igniter is configured to ignite a fuel and air mixture supplied to the combustion chamber of the combustor.

11. The turbine engine according to claim 9,
wherein the outer door is hinge-mounted to the outer diffuser wall and the outer door is configured to rotate to open or to close the opening between the outer diffuser wall and the outer cowl, and
wherein the inner door is hinge-mounted to the inner diffuser wall and the inner door is configured to rotate to open or to close the opening between the inner diffuser wall and the inner cowl.

12. The turbine engine according to claim 9, wherein at least one of the outer door and the inner door are controllable to control a level of opening or closing of the opening between the inner diffuser wall and the inner cowl or the opening between the outer diffuser wall and the outer cowl to control an amount of air flow feeding the dome and swirler.

13. The turbine engine according to claim 12, wherein, when at least one of the outer door and the inner door are partially open, a first portion of the air flow escapes through the opening between the inner diffuser wall and the inner cowl or through the opening between the outer diffuser wall and the outer cowl and a dominant second portion of the air flow continues towards the combustion chamber.

14. A turbine engine comprising:
(A) a compressor section configured to generate compressed air;
(B) a turbine section located downstream of the compressor section; and
(C) a combustion section disposed between the compressor section and the turbine section, the combustion section including a combustor comprising:
(a) an outer liner, an inner liner and a dome which together define a combustion chamber;
(b) a diffuser positioned upstream of the combustion chamber, the diffuser being configured to receive air flow from the compressor section and to provide a flow of compressed air to the combustion chamber;
(c) an outer cowl and an inner cowl located upstream of the combustion chamber, the outer cowl and the inner cowl being configured to direct a portion of air flow from the diffuser to the combustion chamber; and
(d) a louver disposed downstream of the diffuser, the louver being configured and arranged to control an amount air flow reaching the combustion chamber,
wherein the diffuser is configured to output air flow having an amount of air pressure maximized at a center of the air flow so as to optimize total air pressure fed to the combustion chamber through the dome.

15. The turbine engine according to claim 14, wherein the louver comprises an opening located at a central position relative to air flow so, that when facing the air flow that is output by the diffuser, a greater portion of the air flow passes through the opening substantially unimpeded in a center position of the air flow towards the combustion chamber and impeded at edges of the air flow.

16. The turbine engine according to claim 14, wherein the louver comprises an opening located at an edge position relative to air flow, so that when facing the air flow that is output by the diffuser, a greater portion of the air flow passes through the opening substantially unimpeded at the edge position away from the combustion chamber and impeded at a central position of the air flow.

17. The turbine engine according to claim 9, wherein the compressor section comprises an air compressor, wherein air flow output by the diffuser is generated by the air compressor in the compressor section upstream of the diffuser, wherein air pressure from the compressor section is controlled to control a boundary layer of the air flow output by the diffuser to generate the air flow with a concentrated center air profile so as to increase fuel-air mixing in the combustion chamber.

18. A method of controlling air flow in a combustor, the combustor having a diffuser, a dome and a combustion chamber, the method comprising:
injecting compressed air from a compressor section upstream of the diffuser into the diffuser of the combustor;
outputting air flow from the diffuser;
optimizing an amount of pressure of air so as to maximize a pressure of the air flow at a center of the air flow so as to optimize total air pressure fed to the combustion chamber of the combustor through the dome of the combustor, wherein the optimizing of the amount of pressure of air comprises varying an amount of air flow escaping at edges of the air flow; and
controlling an amount of air flow reaching the combustion chamber by a louver disposed downstream of the diffuser.

* * * * *